(12) United States Patent
Sheaffer (10) Patent No.: US 6,957,321 B2
(45) Date of Patent: Oct. 18, 2005

(54) INSTRUCTION SET EXTENSION USING OPERAND BEARING NOP INSTRUCTIONS

(75) Inventor: Gad S. Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 450 days.

(21) Appl. No.: 10/176,020

(22) Filed: Jun. 19, 2002

(65) Prior Publication Data

US 2003/0236965 A1 Dec. 25, 2003

(51) Int. Cl.$^7$ ................................................. G06F 9/30
(52) U.S. Cl. ............................ 712/209; 712/211
(58) Field of Search ................................ 712/209, 210, 712/211, 212

(56) References Cited

U.S. PATENT DOCUMENTS

| | | | |
|---|---|---|---|
| 3,657,705 A | | 4/1972 | Mekota, Jr. et al. |
| 5,353,420 A | | 10/1994 | Zaidi |
| 5,561,775 A | * | 10/1996 | Kurosawa et al. ............ 712/23 |
| 5,572,206 A | | 11/1996 | Miller et al. |
| 5,619,666 A | | 4/1997 | Coon et al. |
| 5,822,559 A | | 10/1998 | Narayan et al. |
| 5,845,102 A | | 12/1998 | Miller et al. |
| 6,539,470 B1 | * | 3/2003 | Mahurin et al. ............. 712/208 |
| 2002/0116599 A1 | * | 8/2002 | Kainaga et al. ............. 712/209 |

FOREIGN PATENT DOCUMENTS

| | | |
|---|---|---|
| WO | WO 93/20507 | 10/1993 |
| WO | WO 97/16785 | 5/1997 |
| WO | WO 97/22922 | 6/1997 |

OTHER PUBLICATIONS

Visual Instruction Set (VIS™) User's Guide, Version 1.1, Mar. 1997, Sun Microsystems, Inc.
AMD–3D™ Technology Manual; Publication #21928, Rev: B; Feb. 1998, Advanced Micro Devices (AMD).

* cited by examiner

*Primary Examiner*—Henry W. H. Tsai
(74) *Attorney, Agent, or Firm*—Shireen I. Bacon (57) ABSTRACT

Instruction set extension using operand bearing no-operation (NOP) or other instructions. In one embodiment, an apparatus can execute a first instruction with an operand associated with a second instruction. The apparatus includes a decoder to identify an operand associated with the second instruction as being designated for the first instruction. An execution unit executes an operation indicated by the first instruction to operate on the operand associated with the second instruction. The second instruction may occur before or after the first instruction in the program sequence.

38 Claims, 8 Drawing Sheets

INSTRUCTION SET EXTENSION USING OPERAND BEARING NOP INSTRUCTIONS

BACKGROUND

1. Field

The present disclosure pertains to the field of processors. More particularly, the present disclosure pertains to a new instruction or a change to an instruction or an instruction set of a processor.

2. Description of Related Art

Computer architects often grapple with the difficulty of extending the instruction set of a processor. Often, instruction sets far outlive their originally contemplated lifespan because an installed base of software makes it profitable to maintain backward compatibility. Therefore, computer architects often add new instructions or new functionality to old instruction sets in order to provide new features yet maintain compatibility with the previously installed software base.

Adding new functionality to an existing instruction set can be a challenging exercise. Typically, an instruction set may have a set of mnemonics that translate into specific opcodes. The opcodes are binary values that are understood by the processor and which cause the processor to execute the intended instruction. Opcodes, however, are typically a particular length (i.e., a particular number of bits). Therefore, there are a finite number of instructions (i.e., $2^N$ instructions for an N bit opcode) that may be represented by an opcode, depending on the number of bits dedicated to the opcode.

One common way to overcome this limitation is to use a "prefix". One opcode may be designated as a prefix (rather than a particular instruction). The prefix indicates that a subsequent value or subsequent values should be decoded differently. In other words, the prefix changes the meaning of at least one subsequent instruction opcode. In some cases, prefixes may be used to define new instructions. In other cases, prefixes may be used to modify the behavior of existing instructions. For example, a prefix may temporarily override default address and/or operand sizes.

In the x86 instruction set, a prefix may be used to specify whether the opcode length is one or two bytes by use of the opcode expansion prefix. Therefore, by the use of prefixes, the total number of potential instructions can be increased. In some cases, a prefix may be used in conjunction with an escape code to define other instructions. In another case, a suffix may be used to specify additional instructions.

An additional limitation of an instruction set is that there may be a limited number of ways to specify operands. As such, there may a limitation on the number of operands that can be explicitly specified for an instruction. One way around this limitation is to implicitly specify where an instruction can find an additional operand by defining a location in the instruction definition, which is understood by the programmers using the instructions. For example, the MASKMOVQ instruction included in Intel's Pentium® Processor with MMX™ technology and subsequent Pentium® processors implicitly defines one of its operands to be located in a specified register. In this type of arrangement, a burden is placed on a programmer to move the appropriate operand into the specified location prior to execution of the instruction that uses that operand.

Another way to implicitly specify operands used in some instruction sets is to group registers together into pairs or quads. For instructions that operate on data which is a multiple of the register size, a single register may be specified and additional adjacent registers may be used to provide the additional operands. This technique has limited flexibility as well because all of the operands are accessed from the specific pre-defined locations in the register pair or quad.

Additional creative ways to provide additional functionality and/or flexibility to an instruction set would be beneficial.

BRIEF DESCRIPTION OF THE FIGURES

The present invention is illustrated by way of example and not limitation in the Figures of the accompanying drawings.

DETAILED DESCRIPTION

The following description provides instruction set extension using operand bearing instructions. In the following description, numerous specific details are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation. While one embodiment is directed to a microprocessor, the techniques described may more generally be applied to other types of electronic processing components that have instruction sets.

A NOP with operands is designed to carry operand information to other instructions preceding and/or following it. Those other instructions may not have enough bits to encode more than a given number of operands (e.g., two source and one destination operand may be specified in some instruction sets). Therefore, if an instruction needs to carry a larger number of operands than is available by the common instruction format, it can be paired with one or more special NOPs, and will use their operand fields as its own. Extending an Instruction Set Architecture (ISA) by preserving the semantics of existing operations may be quite desirable as discussed in the background section. Accepting data from more storage locations than typically supported by an ISA may be a very useful way to increase data level parallelism available to programs, to increase the ratio of data handled per instruction, and in some cases to simplify or shorten programs.

Figure 1A:
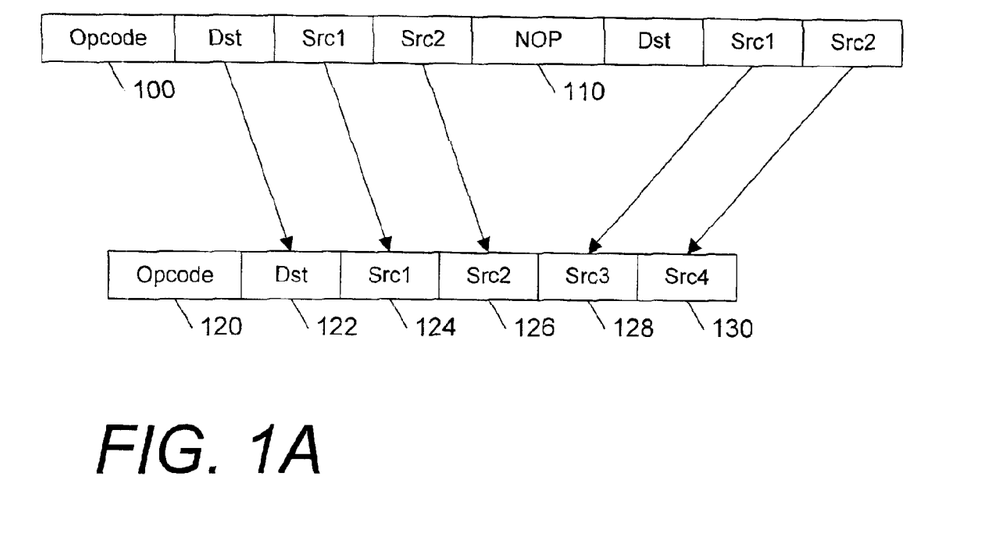
FIG. 1a illustrates the use of two source operands from a No Operation (NOP) instruction by another instruction according to one embodiment.

FIG. 1a illustrates the use of two source operands from a No Operation (NOP) opcode by another instruction according to one embodiment. In the embodiment of FIG. 1a, a first opcode 100 has three associated operands, a destination operand (DST) and two source operands (SRC1, SRC2). An associated operand of an instruction may be specified in a variety of ways. An immediate operand may be directly provided in a code sequence adjacent to the opcode or the other operands of the instruction. Additionally, operands may refer to particular memory or register locations. Typically, some encoding is used to reference either a memory location or a register from one or more sets of registers. This encoding may be referred to as an operand specifier because it specifies where an operand for an instruction can be found. Thus, an operand may be found directly in line in the code sequence with the instruction and its other operands, or may be in a location specified by one or more operand specifiers. Throughout this disclosure, an "operand" or "operands" are frequently referred to rather than separately referring to operands, operand specifiers, and the like, and this single nomenclature is used for simplicity and clarity. Thus, "operand" includes any technique for directly providing an value to be operated on or with or directly or indirectly specifying a location in which a value to be operated on or with may be found.

As used in this disclosure, an "instruction" is a generic term referring to a variety of representations of an operation or set of operations to be performed. An instruction may be represented by a mnemonic, for example, or by an opcode. An opcode is typically a sequence of ones and zeroes that may be represented in hexadecimal or in binary or any other convenient format and is interpretable by a processor as indicating the particular operation(s) to be performed. The operation(s) to be performed are generally specified in an instruction definition for each instruction. For example, a programmer's reference manual, user's manual, or the like may specify operations performed by a processor in response to a particular instruction.

In the embodiment of FIG. 1a, a No Operation (NOP) instruction 110 is shown adjacent to the first opcode 100. Unlike most conventional NOP instructions, the NOP instruction 110 has operands. As shown, the NOP instruction 110 has a destination (DST) operand and two source (SRC1, SRC2) operands. The NOP instruction 110 does not cause any operations to occur that would alter architecturally visible variables, but rather is a vessel that bears additional operands for the opcode 100 in this embodiment. Thus, as shown in FIG. 1a, the NOP is eliminated and its operands used. In particular, the combination of the opcode 100 and its operands as well as the NOP 110 and its operands are decoded into a second opcode 120 having one destination operand 122, and four source operands 124, 126, 128, and 130. The first two source operands 124 and 126 are the two source operands from the opcode 100 and the second two operands 128 and 130 are the two source operands from the NOP 110. The opcode 120 reflects, at least partially, the operations(s) indicated by opcode 100. Thus, the NOP instruction 110 is eliminated and its operands provided for use by the opcode 120.

An opcode is said to "use" or to "operate on" an operand when that operand is specified as one of the arguments to the instruction. As previously noted, the "operand" may be in the form of an operand value or an operand specifier that identifies an operand value by location. If an instruction under its architectural definition does or can utilize the value of the operand either in computing a value, accessing a value, or storing a value, then the instruction is said to "use" or "operate on" the operand. Sometimes the operand may not itself or may not change the ultimate result of the instruction, even if it is used.

Figure 1B:
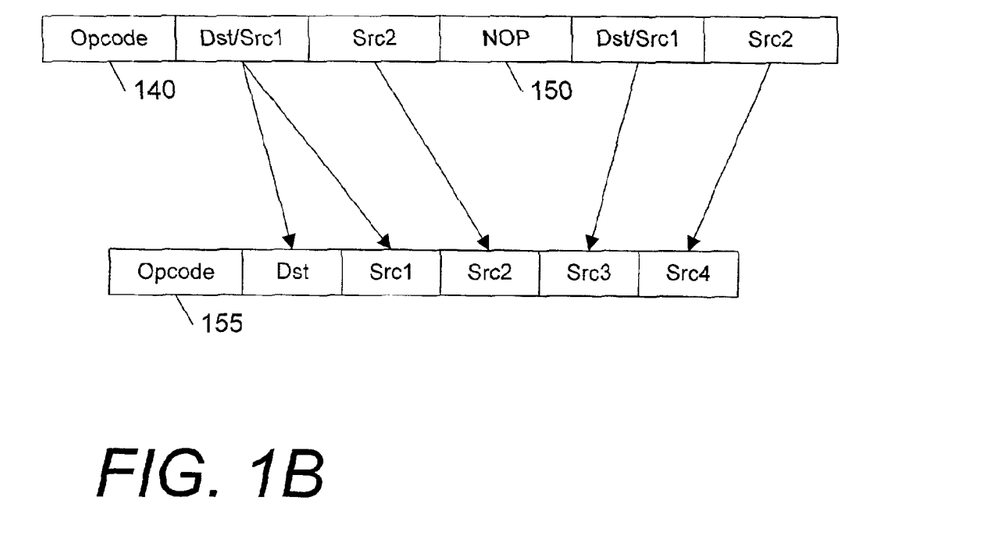
FIG. 1b illustrates the use of two operands from a NOP opcode in a different embodiment.

FIG. 1b illustrates the use of two operands from a NOP opcode 150 by another opcode 140 in a different embodiment. In the embodiment of FIG. 1b, the instruction set of which opcode 140 is a part may be limited to two unique operands, with one of the operands being both a source and a destination. Thus, opcode 140 has a first operand that is a destination and source (DST/SRC1) and a second source (SRC2) operand. Similarly, the NOP opcode 150 has a destination and source operand and a second source operand. In this embodiment, the combination of the opcode 140 and its operands as well as the NOP 150 and its operands are decoded into a second opcode 155 having one destination operand (DST), and four source operands (SRC1, SRC2, SRC3, SRC4), with the first two operands being the two source operands from the opcode 140 and the third and fourth source operands originating as the first and second source operands of the NOP 110.

Figure 1C:
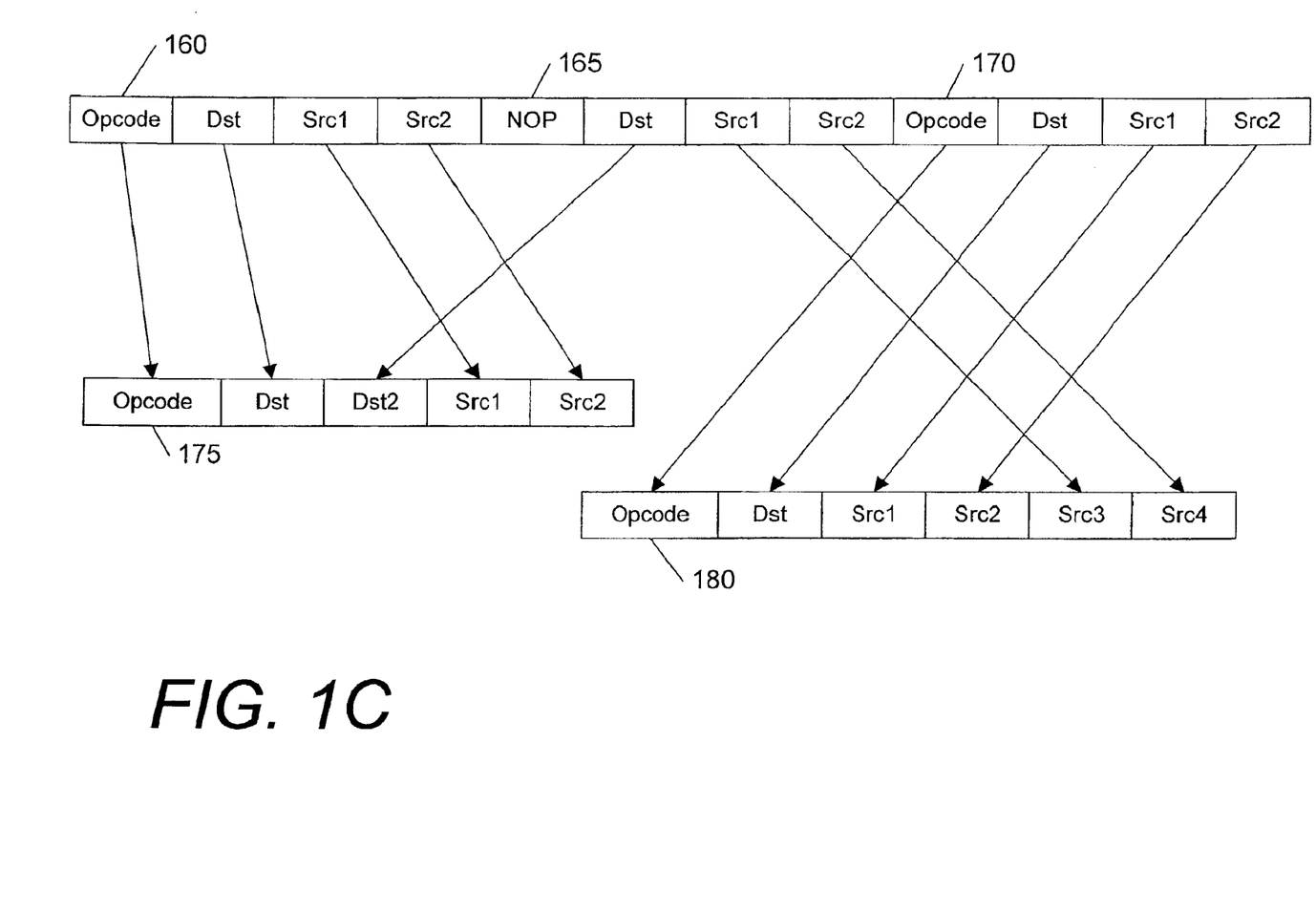
FIG. 1c illustrates the use of operands from a NOP opcode by two other opcodes according to one embodiment.

FIG. 1c illustrates one embodiment in which operands from a NOP 165 are used by two other opcodes. In the embodiment of FIG. 1c, a first opcode 160 having a destination operand and two source operands is transformed into a second opcode 175 which bears two destination operands (DST1, DST2) and two source operands (SRC1, SRC2). The two source operands were originally specified with the opcode 160, as well as the first destination operand. However, the second destination operand is provided from the NOP 165.

A second opcode 170 also having two source operands and one destination operand is transformed into another opcode 180. The opcode 180 has one destination operand from the opcode 170, as well as a first two source operands from the opcode 170 and third and fourth operands from the NOP 165. Thus, one NOP can carry operands for multiple instructions. Further variations may include providing operands to three or more instructions and/or routing different types of instructions to different positions in their new opcodes' operand sets. Furthermore, an operand that may be in the position of a particular type of operand (e.g., a destination) of the NOP may be used for a different purpose in conjunction with the opcode that uses it (e.g., the destination operand of the NOP may be used as a source operand for another opcode). Furthermore, multiple NOPs may provide operands to a single instruction in some embodiments.

Figure 2A:
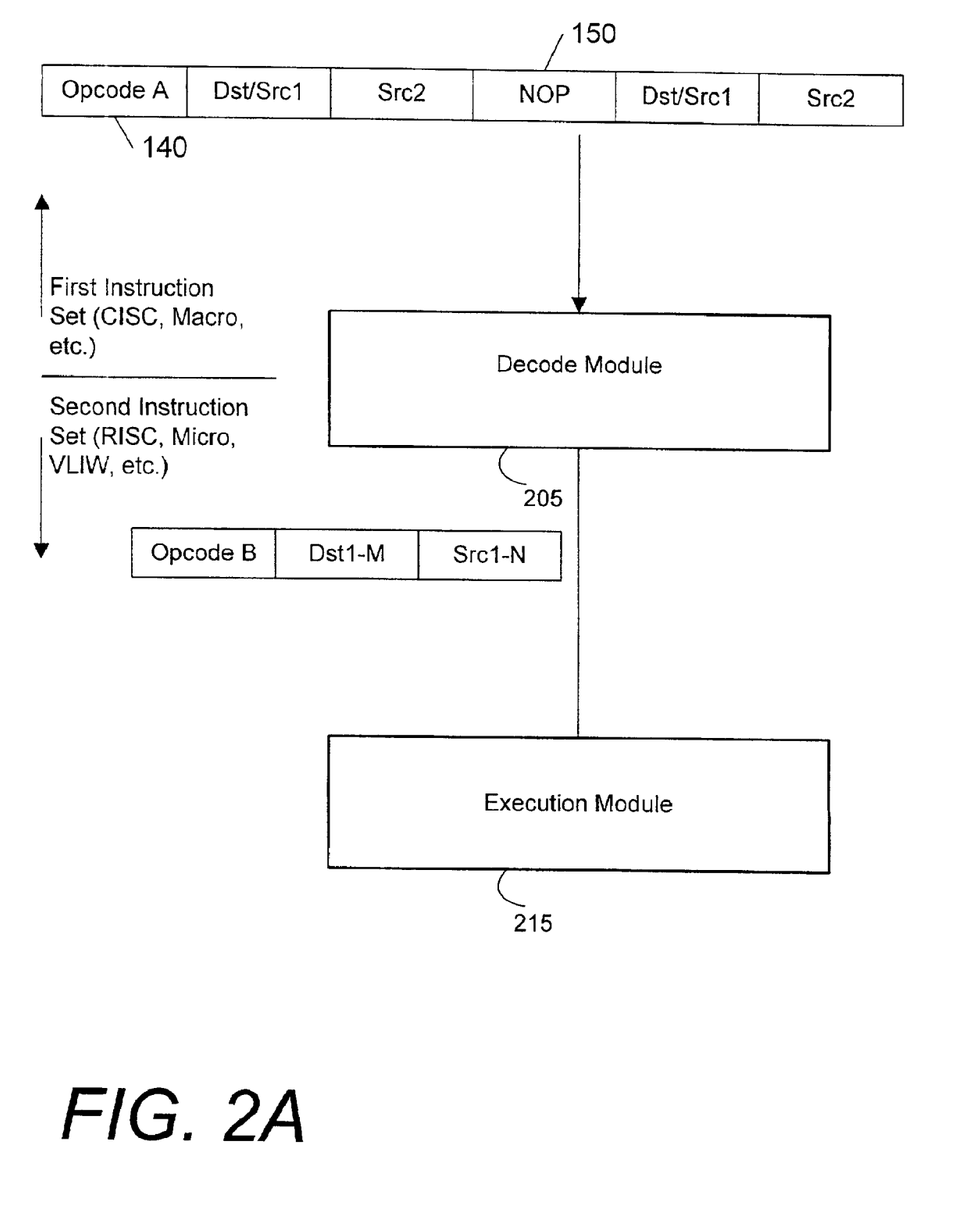
FIG. 2a illustrates modules for translating and executing a NOP instruction bearing operands and an another instruction for which the NOP carries the operands.
Figure 2B:
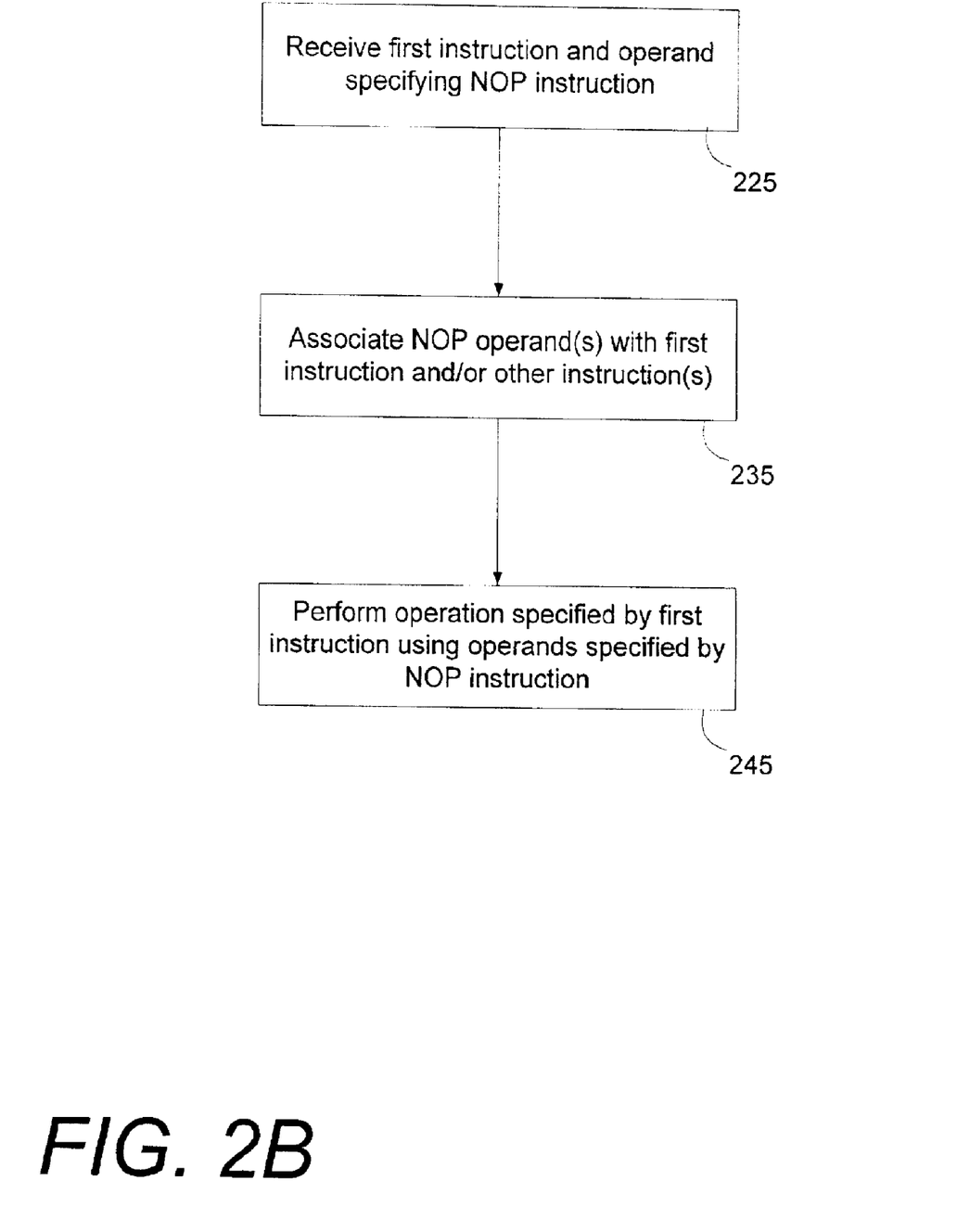
FIG. 2b illustrates a process of providing operands for one instruction with another instruction according to one embodiment.

FIG. 2a illustrates modules for decoding and executing a NOP bearing operands and the associated instruction for which the NOP carries the operands. FIG. 2b illustrates one embodiment of a process that may be carried out by the apparatus of FIG. 2a. As indicated in block 225 of FIG. 2b, a first instruction 140 (Opcode A) and an operand specifying NOP instruction 150 are received by a decode module 205. As illustrated in FIG. 2a, the opcode 140 and its DST/SRC1 and SRC2 operands are processed by a decode module 205 with the NOP 150 and its DST/SRC1 and SRC2 operands. The decode module 205 may be a variety of different types of decoding, translating or transforming entities, depending on the instruction set(s) involved.

Some instruction sets include variable length instructions. Often such instruction sets are considered "complex" and the computers designed around such complex instruction sets are referred to as Complex Instruction Set Computer (CISC) architecture computers. On the other hand, there are also Reduced Instruction Set Computer (RISC) architecture machines. Such machines generally use simpler and smaller instruction sets to accomplish the same tasks by using larger numbers of such instructions (i.e., software becomes more complex).

It is expressly understood that the inventive features of the present disclosure may be usefully embodied in a number of alternative processor architectures that will benefit from the techniques disclosed. RISC, CISC, and hybrid computer architectures may advantageously utilize the disclosed techniques. Moreover, different kinds of processors in different applications may advantageously choose to extend their instruction set or to include in an initial instruction set the ability to utilize operands specified for one instruction with another instruction. General or special purpose processors for computers, servers, personal digital assistants, phones, networking devices, routing devices, etc., may utilize such techniques. Processors may be all hardware, may be software emulated or may utilize a combination of hardware and software emulation to support an "instruction set".

Moreover, a processor may have multiple instruction sets. Processors may have a single macro-instruction set that is available to a programmer. However, some processors may support multiple macro-instruction sets. Furthermore, processors may contain micro-instruction sets or secondary instructions sets. A micro-instruction set may be an instruction set into which a processor translates macro-instructions, with the micro-instructions being only used internally by the processor and not typically accessible to programmers or compilers which are limited to using the macro-instruction set. Similarly, a secondary instruction set may be just a different instruction set (not necessarily internal to any component) into which the first instruction set is translated. For example, a CISC program may be translated into corresponding instructions from another instructions set which are then executed by either hardware or some hardware and/or software and/or firmware combination. For example, a CISC program may be translated into RISC instructions for execution on RISC hardware or into instructions for a Very Long Instruction Word (VLIW) instruction set for execution on a VLIW hardware processor. In any case, all of these different instruction sets and/or processors are just different embodiments that can benefit from the disclosed techniques.

The decode module 205 of the embodiment of FIG. 2a decodes the opcode 140 from a first instruction set (e.g., a Complex Instruction Set Computer (CISC) instruction set, a macro-instruction set, etc.) to a second instruction set. The second instruction set may be a micro-instruction set for use within a processing device, a RISC instruction set, a VLIW instruction set, or any other appropriate type of an instruction set. In other embodiments, the decode module 205 may just perform operand re-arrangement to move the operands of the NOP instruction into a position for use by other instructions.

The decode module 205 may be a hardware decoder in some embodiments. For example, a hardware or logic decoder may be useful in converting macroinstructions to microinstructions for execution by a core of a processor. The decode module 205 may also be a software module that performs binary translation from one instruction set to another instruction set. Moreover, the decode module may be a combination of hardware and software as desired to convert from one instruction set to another. The second instruction set will typically have the capability to allow more operands to be carried by some instructions than the first instruction set. Accordingly, the extra operands added to a NOP instruction in the first instruction set, after the decoding, may be carried along by the instructions with which they are associated.

As indicated in block 235, the decode module 205 associates NOP operands with the first instruction 140. Subsequent to decoding by the decode module 205, the first opcode 140 (Opcode A) may be represented by a different opcode, Opcode B. As mentioned, Opcode B may have a higher operand carrying capacity than Opcode A since it is a translation of Opcode A into a different instruction set. Opcode B is shown as generically having M destination operands, and N source operands, where N and M can be any positive integer numbers. Opcode B, however, specifies the same or a similar operation as did Opcode A. The operation may be modified somewhat or dramatically in different embodiments, in order to utilize the added operands. Moreover, Opcode B may be one of a sequence of opcodes that implement Opcode A.

As indicated in block 245, the new Opcode B is executed by an execution module 215 to perform an operation indicated by Opcode A on some or all of the operands from Opcode A and some or all of the operands from the NOP 150. Much like the decode module 205, the execution module 215 may be implemented in a variety of manners. For example, the execution module 215 may be a hardware execution unit or set of execution units. Alternatively, the execution module 215 may be a combination of hardware and software, or a combination of hardware, firmware, and/or software, etc.

In some embodiments, the NOP instruction itself may specify how its own "extra" operands may be used. In one embodiment, a NOP may specify a fixed relationship to an opcode that will use the NOP operands. In other embodiments, it may be desirable to provide a set of NOP opcodes that allow flexibility as to how the NOP operands may be used. For example, Table 1 provides a set of N NOP opcodes that may be used to distribute the N NOP operands to adjacent instructions in different manners. Some subset or superset of these encodings may be used, or different encodings may be used as well, as will be appreciated by one of skill in the art.

TABLE 1

NOP Opcodes to Specify Operand Usage

|       | Operand 1 | ... | Operand N |
|-------|-----------|-----|-----------|
| NOP 1 | SRC       | ... | SRC       |
| ...   | DST       | SRC | SRC       |
| NOP N | DST       | ... | DST       |

Figure 3A:
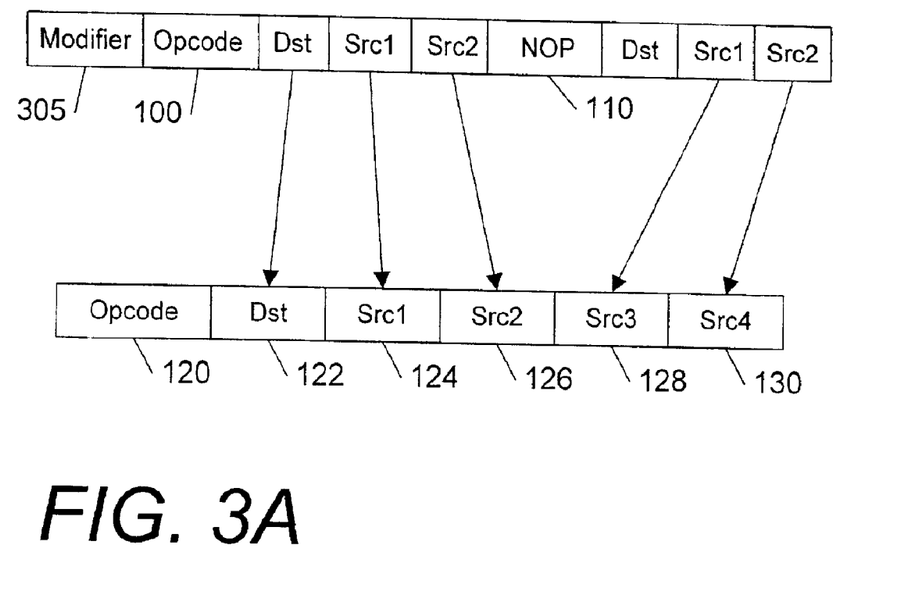
FIG. 3a illustrates one embodiment using a modifier to modify an instruction to use operands from a NOP instruction.

In other embodiments, the NOP itself may not specify how its operands are to be used, but rather various modifiers may be inserted into the instruction stream to specify NOP operand usage. FIG. 3a illustrates an embodiment in which a modifier 305 is used to modify an opcode 100 to use operands from a NOP 110. In the embodiment of FIG. 3a, the modifier 305 immediately precedes the opcode 100 in the stream of instructions as stored in sequentially fetched memory addresses. In other embodiments, other modifiers such as prefixes, escape codes, or the like may separate the modifier 305 from the opcode 100. The modifier indicates to the decode module that the opcode will use operands from the NOP 110. As previously shown, one embodiment generates a new opcode 120 having one destination operand 122 from the opcode 100 as well as two source operands 124 and 126 from the opcode 100, and two source operands 128 and 130 from the NOP 110.

Figure 3B:
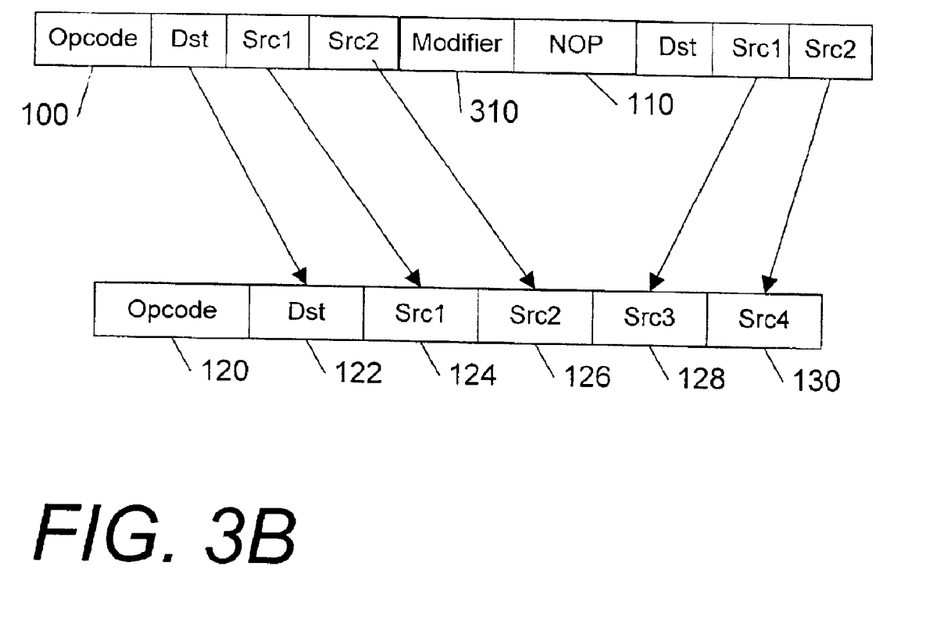
FIG. 3b illustrates one embodiment using a modifier to modify a NOP instruction to indicate how its operands should be used.

FIG. 3b illustrates another embodiment using a modifier 310. The modifier 310 in FIG. 3b modifies the NOP 110 instead of modifying the opcode 100. The modifier 310 indicates how the operands of the NOP 110 are to be distributed to other surrounding opcodes. As previously shown, one embodiment generates a new opcode 120 having one destination operand 122 from the opcode 100 as well as two source operands 124 and 126 from the opcode 100, and two source operands 128 and 130 from the NOP 110.

In one embodiment, the modifiers (either 305 or 310) may be prefixes which are used to specify the distribution or just to indicate the use of the operands from a nearby NOP operand. In some embodiments, the opcode-modifying prefixes may specify that operands be taken from a fixed location (e.g., a NOP before or after the modified opcode). Similarly, the NOP-modifying prefixes may also specify that the NOP operands be passed to a specifically sequenced (before or after) instruction. Alternatively, a variety of prefixes may be used to provide flexibility.

Table 2 illustrates a more elaborate encoding technique to allow more flexibility as to where additional operands may be obtained. Although Table 2 is provided for prefixes, this technique is equally applicable to NOPs. In other words, a larger number of NOPs could be used than illustrated in Table 1 to provide all the flexibility shown with respect to prefixes in Table 2.

TABLE 2

Prefixes to Specify Operand Usage

| | Before | After | Operand 1 | ... | Operand N |
|---|---|---|---|---|---|
| Prefix 1 | x | | SRC | SRC | SRC |
| ... | | x | SRC | SRC | DST |
| Prefix Q | x | | SRC | DST | DST |
| ... | | | DST | SRC | SRC |
| Prefix $2^{N+2}$ | | x | DST | DST | DST |
| Prefix $2^{N+2}$ + 1 | x | x | SRC-BEF | | DST-AFT |
| ... | | | SRC-BEF | SRC-AFT | DST-AFT |
| Prefix M | x | x | DST-BEF | ... | SRC-AFT |

As an example, according to Table 2, Prefix Q indicates that the NOP operands should be used for the instruction before the NOP, that the first NOP operand should be used as a source operand and that the last NOP operand should be used as a destination operand, and that at least one other destination operand is to be obtained from the NOP. Prefixes $2^{N+2}$+1 through M are particularly flexible in that they allow some operands to be used with a prior instruction and some to be used with a subsequent instruction. Any subset or superset of these encodings may be used to specify how NOP operands may be distributed, as will be appreciated by one of skill in the art. Moreover, other modifiers may be used as appropriate with a particular instruction set. For example, escape codes or suffixes or other instruction modifying values that suggest a different interpretation of a given opcode may be used.

Figure 4:
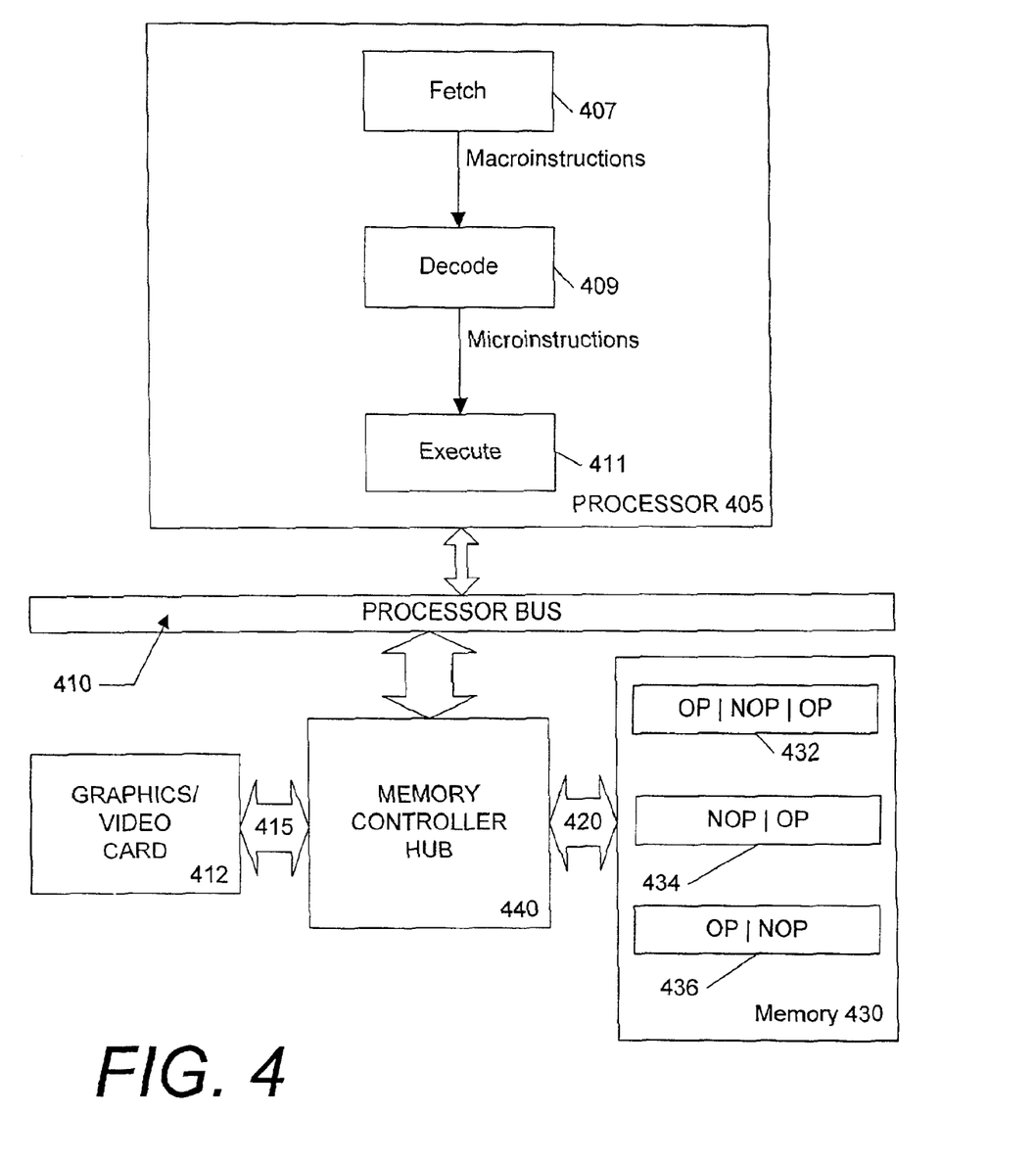
FIG. 4 illustrates one embodiment of a system that processes NOP instructions bearing operands.

FIG. 4 illustrates one particular embodiment of a system that processes NOP instructions bearing operands. The embodiment of FIG. 4 includes a processor 405 that decomposes macroinstructions into microinstructions. The processor 405 is coupled via a processor bus 410 to a memory controller hub 440. The memory controller hub 440 is coupled by a memory bus 420 to a memory 430 and is coupled by a graphics bus 415 to a graphics/video module 412. The processor 405 includes a fetch module 407, a decode module 409 and an execute module 411. The processor 405 executes instructions from the memory 430. The fetch module 407 fetches macroinstructions from the memory 430. The decode module 409 receives macroinstructions and decodes them into microinstructions for execution by the execute module 411.

FIG. 4 illustrates a variety of NOP and instruction combinations that share operands. A code segment 432 in the memory 430 includes two opcodes separated in a sequence by a NOP. In this case, the decode module 409 recognizes that the NOP carries operands for both the preceding and subsequent instructions. These instructions are preceding and subsequent in terms of program execution order and may or may not be in contiguous memory locations depending on their size, any intervening operand specifiers and/or modifiers, as well as depending on the actual order of program execution.

A code segment 434 illustrates a NOP/opcode pair with the NOP preceding the opcode. In this code segment 434, the NOP may be of the type that carries operands for a single instruction in a fixed location, or may be a NOP that a modifier specifies carries operands for the opcode. Similarly, a code segment 436 illustrates that the NOP may follow the instruction for which it carries operands. The NOP itself is typically received by the decode module 409 and essentially discarded after its operands are extracted. Since the NOP itself changes no register or memory values, there is no need to pass the NOP or a translated version thereof beyond the decoder.

In some embodiments, other instructions other than NOP instructions may be used to carry operands for other instructions. A NOP is just an example of an instruction that can carry operands that may be convenient because a NOP is generally defined to not change architectural state variables as it executes (although instruction pointers and the like may change). Other new instructions could be defined specifically for the purpose of carrying operands. Alternatively, some existing opcodes that do not use the entire number of operands that an instruction could be modified by modifiers to use their unused operand slots to carry operands for other instructions. Thus, while NOPs are used in one embodiment, other instructions may be used to carry operands. These other instructions may or may not be executed. However, the operand carrying instruction does not use or operate on the carried operand, but rather passes this operand to the opcode for which it was intended.

Figure 5:
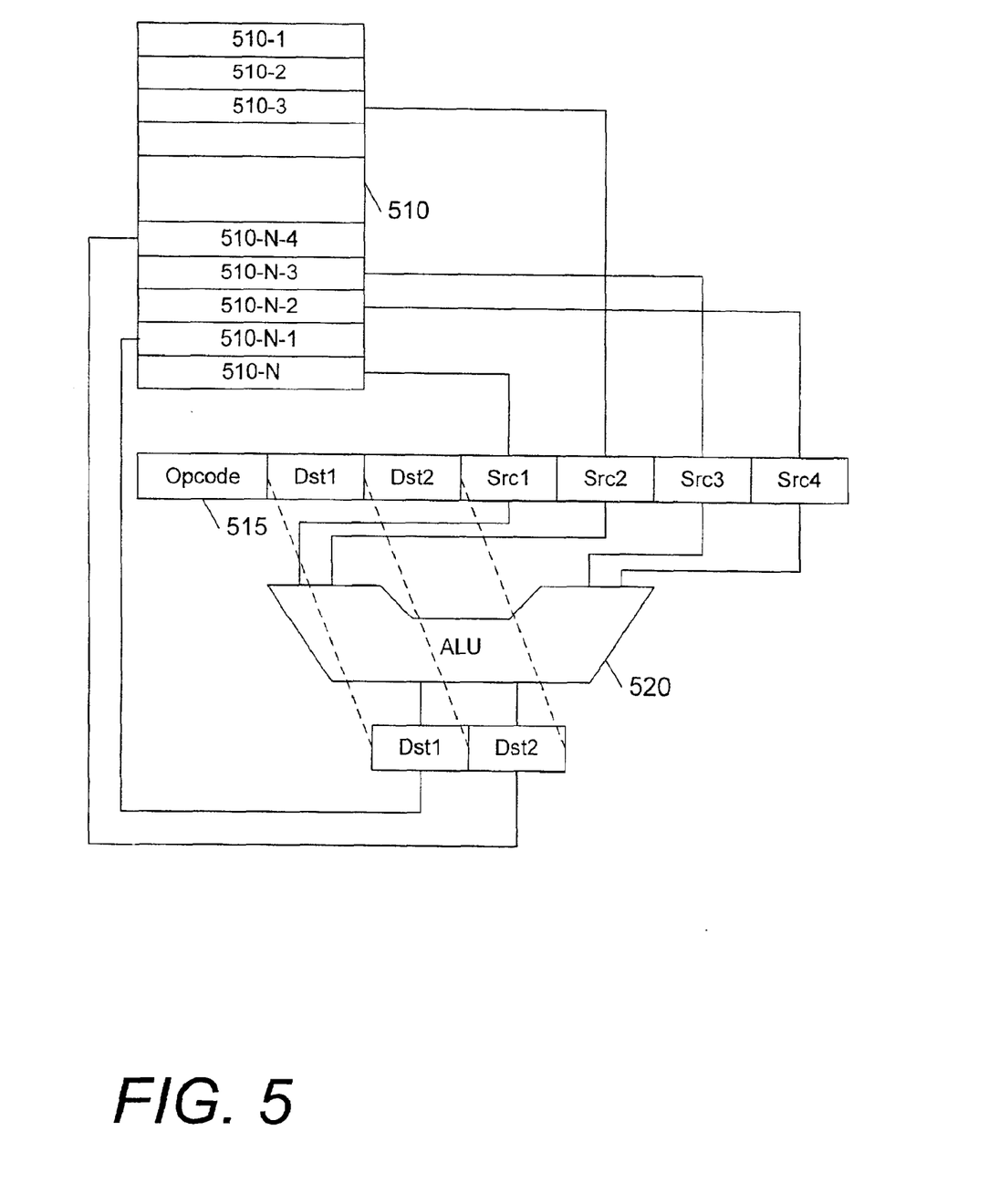
FIG. 5 illustrates one embodiment of an instruction performing operations on operands from two instructions.

The ability to specify additional operands may be quite advantageous in some embodiments, as new functions may be provided and/or instruction sequences may be simplified and/or shortened. FIG. 5 illustrates one embodiment of an instruction performing operations on operands originally from two instructions. In the embodiment of FIG. 5, an opcode 515 is shown subsequent to decoding by a decode module that expands the instruction set operands from a total of three operands in an external representation to two destination and four source operands. As a result, the opcode 515 is in an internal format (e.g., a microinstruction format) that supports the larger number of operands shown.

In this embodiment, the opcode 515 has four source operands specifying registers from a register file 510 having N registers. A first source operand specifies register 510-N. A second source operand specifies register 510-3, whereas a third source operand specifies register 510-N-3, and a fourth source operand specifies register 510-N-4. The ability to uniquely specify more operands as shown in FIG. 5 may simplify coding in that it may eliminate the need to shuffle register contents (e.g., via a separate shuffle instruction) since a larger number of individual registers can be addressed by a single opcode.

In the embodiment of FIG. 5, two destination specifiers are used to designate where to store results of an arithmetic operation performed by an Arithmetic and Logic Unit (ALU) 520. In this example, two results are generated and are stored as specified by a first destination operand in register 510-N-1 and 510-N-4. In other words, two registers may be used to effectively specify one wider register to store results. More or fewer source and destination operands may be used in other cases. Thus, great flexibility may be gained by having a generic mechanism to increase the number of operands that may be used by a single instruction.

For example, butterfly type calculations generating two results may be implemented without implicit specification of operands in an instruction set having too few operand slots to carry the necessary operands with one instruction. Another example is a single instruction multiple data (SIMD) type instruction, which may output a larger result than one register can accommodate. Another example is a complex addressing scheme, in which multiple components are used to calculate an address (e.g., a base, offset, and scale, or other address components may be used in an address calculation). Yet another example is that more or longer immediate operands may be provided. Any of these operands or operand-like quantities may be specified via a NOP bearing operands.

Figure 6:
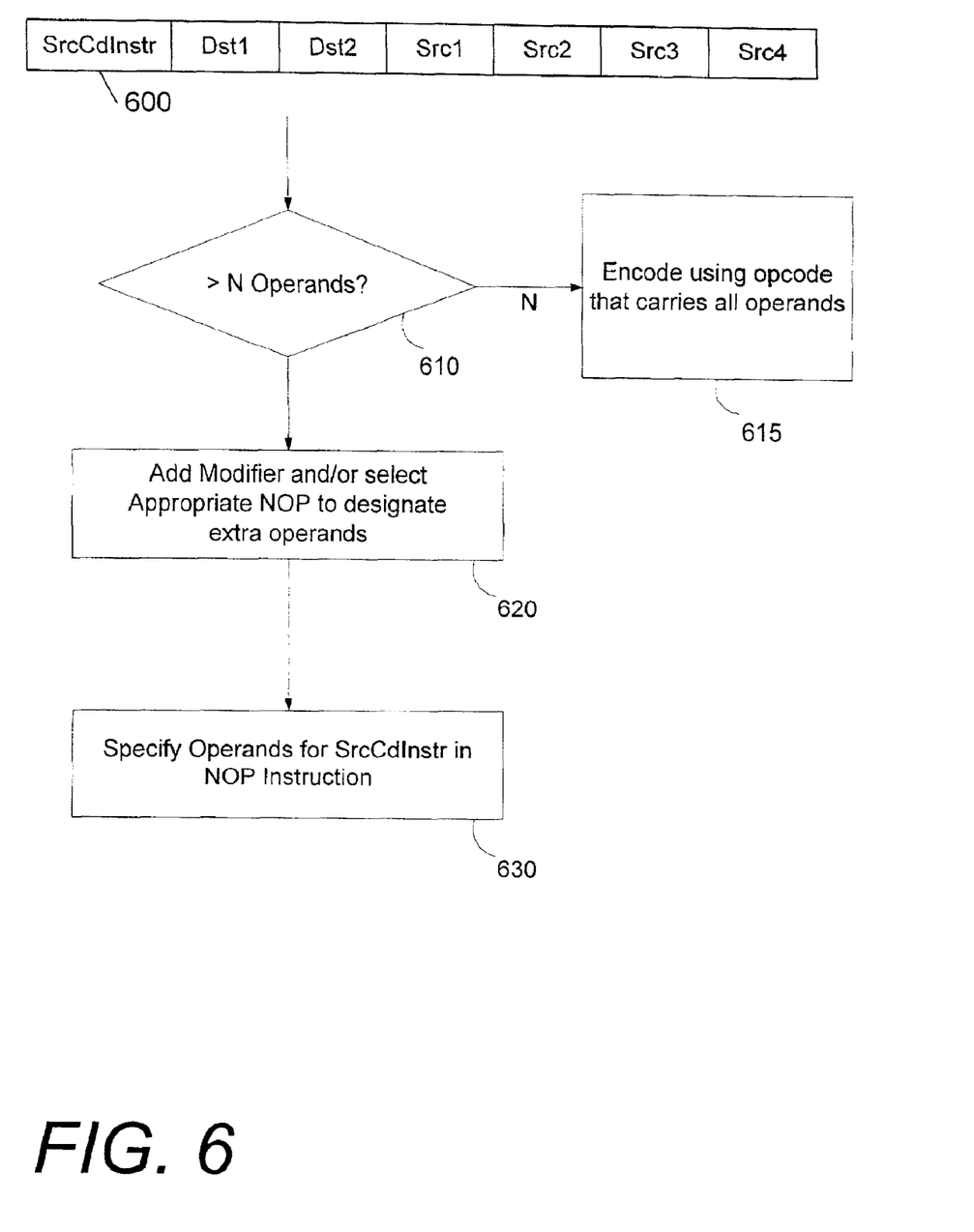
FIG. 6 illustrates a process flow for a compiler processing source code to generate a native instruction stream including a NOP instruction bearing operands according to one embodiment.

FIG. 6 illustrates a process flow for a compiler processing source code to generate a native instruction stream including a NOP instruction bearing operands. As indicated in FIG. 6, a source code instruction 600 may specify two destinations and four source operands. The exact number of source and/or destination operands is not particularly important. The compiler, however, determines whether this number is a number that is greater than typically handled by a first or a standard encoding of the source code instruction as indicated in block 610. If the number of operands specified is the normal number for this type of source code instruction, then the source code instruction is encoded with an opcode that carries all the operands for that opcode as indicated in block 615.

If a greater number operands are specified in the source code than typically handled by a selected opcode, then the compiler adds a modifier and/or selects an appropriate NOP to designate the extra operands as indicated in block 620. Then, as indicated in block 630, the compiler specifies the extra operands with the NOP instruction. Accordingly, source code may be compiled to allow the specification of a larger number of operands than a single opcode can itself carry. Additionally, this technique may be convenient in other scenarios where opcode carrying is not a strict limitation, but it is otherwise convenient to have one instruction bear operands for another instruction.

A hardware design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. In a software design, the design typically remains on a machine readable medium. An optical or electrical wave modulated or otherwise generated to transmit such information, a memory, or a magnetic or optical storage such as a disc may be the machine readable medium. Any of these mediums may "carry" the design information.

Thus, instruction set extension using operand bearing instructions is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
a decoder to identify an operand of a second instruction as being an operand of a first instruction, wherein said second instruction is a no-operation (NOP) instruction;
an execution unit to execute an operation indicated by said first instruction to operate on said operand.

2. The apparatus of claim 1 wherein said operand is an additional operand specified to the first instruction only by an operand specifier of the second instruction.

3. The apparatus of claim 1 wherein said NOP instruction is further to specify a second operand, and wherein said first instruction is a prior instruction and further wherein said operand is to be operated upon by said prior instruction and said second operand is to be operated on by a subsequent instruction.

4. The apparatus of claim 1 wherein said second instruction is further to specify a second operand and a third operand, and wherein said operand is a destination operand to be operated on by said first instruction and wherein said second operand and said third operand are source operands to be operated on by said first instruction.

5. The apparatus of claim 1 wherein a four or more operand internal opcode format is supplied with operands from a three-operand external opcode format by specifying additional operands with said NOP instruction.

6. The apparatus of claim 1 wherein said decoder is to receive said first instruction and said second instruction, which are both macro-instructions, and to produce a micro-instruction to at least partially implement said first instruction using said operand from said second instruction.

7. The apparatus of claim 1 wherein said second instruction is an instruction with an unused operand slot which is filled by said operand for said first instruction.

8. The apparatus of claim 1 wherein an opcode of said NOP instruction is to indicate whether said second instruction is before or after said first instruction.

9. The apparatus of claim 1 wherein a prefix for said first instruction is to indicate whether said second instruction is before or after said first instruction.

10. The apparatus of claim 1 wherein a modifier of said first instruction is to extend said first instruction to also operate on the operand from said second instruction.

11. The apparatus of claim 10 wherein said modifier comprises a prefix.

12. The apparatus of claim 10 wherein said first instruction is a mathematical instruction, wherein said mathematical instruction is to normally operate on two source operands associated with said mathematical instruction if said modifier is not present and wherein said mathematical instruction is to operate on four source operands, two associated with said mathematical instruction and two associated with said NOP instruction if said modifier is present.

13. The apparatus of claim 1 wherein said first instruction has associated therewith a first instruction first source operand, a first instruction second source operand, and a first instruction destination operand specifier, and further wherein said second instruction has associated therewith a second instruction first source operand and a second instruction second source operand, and wherein said execution unit is to store according to said first instruction destination operand specifier a result from said operation using said first instruction first source operand, said first instruction second source operand, said second instruction first source operand and said second instruction second source operand.

14. The apparatus of claim 1 wherein said decoder is further to identify a second instruction destination operand specifier associated with said second instruction as being for use of said first instruction, and further wherein said execution unit is to store a result of said operation according to said second instruction destination operand specifier.

15. The apparatus of claim 1 wherein said first instruction has associated therewith a first instruction first source operand, a first instruction second source operand, and a first instruction destination operand specifier, and further wherein said second instruction has associated therewith a second instruction first source operand, a second instruction second source operand and a second instruction destination operand specifier, and wherein said execution unit is to store according to said first instruction destination operand specifier a result from said operation using said first instruction first source operand, said first instruction second source operand, said second instruction first source operand and said second instruction second source operand, and further wherein a third instruction having a third instruction first destination operand specifier executed by said execution unit is to perform a second operation and to store a third operation first result according to said third instruction first destination operand specifier and is to store a third operation second result according to said second instruction destination operand specifier.

16. An apparatus comprising:
a decoder to receive a first macroinstruction having a first plurality of operands and a No Operation (NOP) macroinstruction having a second plurality of operands and to generate, responsive to said first macroinstruction and said NOP macroinstruction, a first microinstruction having a third plurality of operands comprising said first plurality of operands and said second plurality of operands;
execution logic to execute said first microinstruction to operate on said third plurality of operands.

17. The apparatus of claim 16 wherein said decoder is further to receive a modifier to indicate to use operands from said NOP macroinstruction for said first macroinstruction.

18. The apparatus of claim 17 wherein said modifier comprises a prefix.

19. The apparatus of claim 18 wherein said prefix is associated with said first macroinstruction.

20. An apparatus comprising:
a decode module to identify an operand specifier associated with a second instruction as being for use of a first instruction;
an execution module to execute said first instruction using said operand specifier associated with said second instruction to identify an operand for said first instruction;
wherein said decode module is to use said operand specifier from said second instruction for said first instruction in response to a modifier of said first instruction.

21. The apparatus of claim 20 wherein said operand specifier specifies a source operand.

22. The apparatus of claim 20 wherein said operand specifier specifies a destination operand.

23. The apparatus of claim 20 wherein said modifier is a prefix.

24. The apparatus of claim 20 wherein said decode module comprises a hardware decoder.

25. The apparatus of claim 20 wherein said decode module comprises a software decoder.

26. The apparatus of claim 25 wherein said software decoder is to decode said first instruction and said second instruction from one instruction set into another instruction set.

27. An apparatus comprising:
means for decoding a first instruction and a second instruction having an associated specifier that specifies an operand for the first instruction;
means for executing said first instruction using said specifier to specify an operand for said first instruction;
wherein said specifier specifies a destination operand of said second instruction for use as a second destination by said first instruction.

28. The apparatus of claim 27 wherein said means for decoding further comprises means for translating said first instruction into a first microinstruction and wherein said means for executing said first instruction receives said first microinstruction and executes said first instruction by executing at least said first microinstruction.

29. The apparatus of claim 27 wherein said specifier specifies one or more source operands of said second instruction for use as sources of the first instruction.

30. A system comprising:
a memory to store a first instruction and a second instruction having an operand specifier;
a processor to execute said first instruction using said operand specifier from said second instruction to determine a location of an operand;
wherein a modifier stored in the memory indicates that said first instruction is to use said operand specifier from said second instruction.

31. The system of claim 30 wherein the system further comprises a memory controller coupled to the processor and a graphics module coupled to said memory controller, wherein said memory controller is to provide said first instruction, said second instruction, and said operand specifier from said memory to said processor.

32. The system of claim 30 wherein said operand specifier specifies an extra source operand for said first instruction.

33. The system of claim 32 wherein said operand specifier specifies an extra destination operand for said first instruction.

34. The system of claim 30 wherein said modifier comprises a prefix for said first instruction.

35. A processor comprising execution logic to execute an instruction using N operands, wherein said execution logic is also to execute said instruction using a number of greater than N operands by utilizing at least one operand from a no-operation (NOP) instruction to reach the number of greater than N operands for the instruction.

36. The processor of claim 35 wherein said NOP instruction follows said instruction.

37. The processor of claim 36 wherein said NOP instruction precedes said instruction.

38. The processor of claim 35 wherein a prefix precedes said instruction to indicate that additional operand(s) from the NOP instruction are to be operated on by said instruction.

* * * * *